(12) United States Patent
Italia et al.

(10) Patent No.: US 8,697,781 B2
(45) Date of Patent: Apr. 15, 2014

(54) BITUMINOUS MIXTURES WITH A HIGH POLYMER CONTENT

(75) Inventors: Paolo Italia, Milan (IT); Luigi D'Elia, Pandino (IT)

(73) Assignee: ENI S.p.A., Rome (IT)

( * ) Notice: Subject to any disclaimer, the term of this patent is extended or adjusted under 35 U.S.C. 154(b) by 401 days.

(21) Appl. No.: 13/128,353

(22) PCT Filed: Nov. 5, 2009

(86) PCT No.: PCT/IB2009/007390
§ 371 (c)(1),
(2), (4) Date: Jun. 30, 2011

(87) PCT Pub. No.: WO2010/052567
PCT Pub. Date: May 14, 2010

(65) Prior Publication Data
US 2011/0257308 A1   Oct. 20, 2011

(30) Foreign Application Priority Data

Nov. 10, 2008 (IT) .................................. MI08A1980

(51) Int. Cl.
*C08L 95/00* (2006.01)

(52) U.S. Cl.
USPC ............................................. 524/52; 524/68

(58) Field of Classification Search
USPC ................................................... 524/68, 52
See application file for complete search history.

(56) References Cited

U.S. PATENT DOCUMENTS

2008/0153945 A1   6/2008  Prejean et al.

FOREIGN PATENT DOCUMENTS

| DE | 146 222 | 1/1981 |
|----|---------|--------|
| DE | 199 52 846 | 8/2005 |
| EP | 0 690 102 | 1/1996 |
| EP | 0 690 102 A1 * | 1/1996 |
| FR | 2 765 232 | 12/1998 |
| GB | 1 284 726 | 8/1972 |
| WO | 97 09385 | 3/1997 |
| WO | WO 97/09385 * | 3/1997 |
| WO | 2006 107908 | 10/2006 |
| WO | 2008 046524 | 4/2008 |
| WO | 2008 155118 | 12/2008 |
| WO | 2009 016281 | 2/2009 |

OTHER PUBLICATIONS

International Search Report issued Apr. 14, 2010 in PCT/IB09/007390 filed Nov. 5, 2009.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

The invention relates to a process for the preparation of mixtures containing bitumen and thermoplastic polymer at a high concentration, stable during storage, with particular characteristics of easy processability and movability which, once diluted, allow modified bitumens to be obtained with high performance characteristics. In particular, the process allows mixtures containing bitumen, thermoplastic polymer and wax, to be prepared, wherein the polymer is in a quantity varying from 5 to 30% by weight with respect to the weight of the mixture consisting of bitumen and polymer, and the wax is in a quantity varying from 4.7 to 16.7% by weight with respect to the weight of the total mixture, and comprises reacting a concentrated mixture (A), stable during storage, containing bitumen and from 5 to 30% by weight of thermoplastic polymer, with a hydrocarbon wax containing at least 40 carbon atoms and having a melting point of at least 700 C., in a weight ratio between the mixture (A) and wax ranging from 100:5 to 100:20, at a temperature ranging from 160 to 2000 C. and for a time ranging from 15 minutes to 7 hours, preferably from 15 to 120 minutes. An object of the invention also relates to new mixtures containing bitumen and thermoplastic polymer at a high concentration and mixtures obtainable from these by dilution.

16 Claims, No Drawings

BITUMINOUS MIXTURES WITH A HIGH POLYMER CONTENT

The present invention relates to a process for the preparation of mixtures containing bitumen and thermoplastic polymer at a high concentration, stable during storage, with particular characteristics of easy processability and movability which, once diluted, allow modified bitumens to be obtained with high performance characteristics.

An object of the invention also relates to new mixtures containing bitumen and thermoplastic polymer at a high concentration and the mixtures obtainable from these by dilution.

It is known that in order to improve the quality of bitumens, particularly from the point of view of low-temperature flexibility and consistency under heat, various types of polymers are often used, in particular polymers of the elastomeric type. The most effective polymers are considered to be block copolymers of the styrene-butadiene family, which, however, generally have the disadvantage of having a low compatibility with the same bitumen, causing phase separation when heated: under static conditions an upper layer prevalently rich in polymer and a lower layer rich in bitumen alone, are formed.

Numerous processes have been proposed in order to solve this problem. EP 458386, for example, indicates a method which consists in maintaining the bitumen mixture and polymer at a high temperature and for a long time. Alternatively, in EP 496457 the bitumen/polymer compatibility is obtained by adding an unsaturated aliphatic di-carboxylic acid, or the relative anhydride, to the mixture. In EP 640665, the bitumen/polymer compatibility is obtained by adding an unsaturated organic compound to the mixture.

In particular, EP 718372 describes a process which allows the preparation of bitumens stable during storage, prepared at non-high temperatures and without additives, with the use in controlled sequence of bituminous products having different contents of resins, asphaltenes, aromatic compounds and saturated products (paraffins).

According to this process, it is possible to prepare mixtures with a high polymer content, to be subsequently diluted to the desired content on the basis of the performances required for the final product. This possibility is particularly appreciable in economic terms as it is possible to obtain, at peripheral secondary plants, high quantities of product by diluting mixtures with a strong initial content of polymer.

From a practical point of view, however, this process could have some drawbacks on an industrial scale, mainly due to the high viscosity induced by the polymer with respect to the bitumen.

Strong additions of polymer, in fact, require high temperatures for the movement and storage of the mixture within the production facilities, with the possible degradation of the polymeric phase. The high viscosity deriving from the addition of the polymer also implies reduced movement times outside the production facilities, as high temperatures are difficult to maintain for a long period of time on normal transfer vehicles of bituminous products. Furthermore, problems of use could be due to the cooling of the mass for accidental reasons.

The drawbacks indicated above, such as high viscosity of the bituminous mass and its easy tendency to degradation deriving from the high temperature, represent a limit to the concentration of the polymer in the concentrated blend.

This practically leads to a limit in the percentage of use of the polymer, with a lesser convenience of use in dilution in peripheral secondary plants, as the dilution ratios are lower with the same performances that can be obtained.

The Applicant has now found a process for the preparation of mixtures containing bitumen and thermoplastic polymer at a high concentration (concentrated blends), stable during storage, with particular characteristics of easy processability and movability, which, once diluted, allow modified bitumens to be obtained with high performance characteristics.

This new process is based on the use, in the formulation of the mixture, of hydrocarbon waxes having a high molecular weight and high melting point.

It is known that compounds such as waxes (conventionally also called saturated compounds or paraffins) are naturally present in bitumen. These products however have a low molecular weight (lower than 40 carbon atoms) and a low melting point (lower than 70° C.): their presence in a concentration of over 2.2% by weight (see European regulation EN 12591) reduces the quality of the bitumen, as it can cause the "slow-setting" phenomenon in the bituminous conglomerate.

The Applicant has now found that the addition of waxes with a high molecular weight and a high melting point, to concentrated bituminous compositions, stable during storage, allows mixtures to be obtained having a high content of polymer, stable with time, with optimum characteristics of easy processability and movability, which, when diluted, give rise to bitumens having high performance characteristics.

A first object of the present invention therefore relates to a process for the preparation of mixtures containing bitumen and thermoplastic polymer and wax, wherein the polymer is in a quantity varying from 5 to 30% by weight with respect to the weight of the mixture consisting of bitumen and polymer alone, and the wax is in a quantity varying from 4.7 to 16.7% by weight with respect to the weight of the total mixture, which comprises reacting a concentrated mixture (A), characterized in that it is stable during storage, containing bitumen and from 5 to 30% by weight of thermoplastic polymer, with a hydrocarbon wax containing at least 40 carbon atoms and having a melting point of at least 70° C., in a weight ratio between the mixture (A) and wax ranging from 100:5 to 100:20, at a temperature ranging from 160 to 200° C. and for a time ranging from 15 minutes to 7 hours, preferably from 15 to 120 minutes.

The evaluation of the stability during storage is effected, for example, by means of the "tube test" system which allows even slight differences in homogeneity to be revealed in the mixture, due to stratification or migration of the polymer contained therein. In order to effect the test, the mixture is introduced into a cylindrical tube closed at one end and the tube is placed in an oven at 180° C. for a predetermined time of 3 days. At the end of the test, the tube containing the mixture is cooled to a low temperature, the casing is cut and the layers are separated at the head and bottom of the cylinder, composed of the bituminous mixture made compact by the lowering of the temperature. The measurement of the softening point is effected on these portions. The mixture is considered stable if the difference between the values at the head is not higher than 3° C.

A particularly preferred aspect of the present invention is that the concentrated bituminous mixture (A) containing bitumen and thermoplastic polymer, stable during storage, is prepared according to the method described in EP 718372.

A particular object of the present invention therefore relates to a process for preparing mixtures of bitumen, thermoplastic polymer and wax, wherein the polymer is in a quantity varying from 5 to 30% by weight with respect to the weight of the mixture consisting of bitumen and polymer alone, and the wax is in a quantity varying from 4.7 to 16.7% by weight with respect to the weight of the total mixture, characterized in that:

(a) a bituminous product having a content of total asphaltenes, resins, saturated and aromatic compounds such as to satisfy the condition that the value of $I_C$ ranges from 0.200 to 0.270 in the expression:

$$I_C=(C7+C5+S)/(A+R)$$

wherein:
C7=concentration of asphaltenes precipitated with n-heptane, in weight %;
C5=concentration of asphaltenes precipitated with n-pentane, in weight %;
S=concentration of saturated compounds, in weight %;
A=concentration of aromatic compounds in weight %;
R=concentration of resins, in weight %
is reacted at a temperature ranging from 160° C. to 200° C. and for a time ranging from 15 minutes to 7 hours, preferably from 15 to 120 minutes with a thermoplastic polymer, in a weight ratio between bitumen and polymer which varies from 70:30 to 95:5;

(b) the mixture resulting from step (a) is reacted at a temperature ranging from 160 to 200° C., for a time ranging from 15 minutes to 7 hours, preferably from 15 to 120 minutes, with a hydrocarbon wax containing at least 40 carbon atoms and having a melting point of at least 70° C., in a weight ratio between the mixture resulting from step (a) and wax which varies from 100:5 to 100:20.

In step (a), the bituminous products are those containing asphaltenes precipitable with n-heptane and n-pentane, resins, aromatic compounds and saturated compounds in such proportions as to satisfy the above ratio.

For these products, the value $I_C$, as defined above, preferably ranges from 0.240 to 0.260.

Bituminous products which can be well-used in the process of the present invention, and in particular bituminous products which can be well-used in step (a), consist of a bituminous component selected from distillation bitumens, aromatic distillates from petroleum or, preferably, from mixtures of these provided that the mixture, in the case of use according to step (a) described above, satisfies the ($I_C$) requisites specified above. Particularly suitable are mixtures of aromatic extracts from a lubricating base and vacuum residue.

Polymers which can be well-used in the process of the present invention, and in particular, well-used in step (a) of the above process, are copolymers of the elastomeric type. Particularly useful are block copolymers between vinyl benzenes and conjugated dienes with a radial structure. This category of polymers can be represented with the general formula $X(A-B)_m$, wherein A represents a block obtained from monomers of the vinyl aromatic type, B is a block obtained from diene monomers, X is a radical deriving from a coupling agent and m is a number depending on the coupling agent used, preferably from 3 to 5. Particularly suitable for obtaining stable mixtures are radial copolymers containing blocks of polystyrene and polybutadiene (so-called SBS), normally with a styrene/butadiene ratio ranging from 20/80 to 40/60 and a molecular weight ranging from 50,000 to 1,000,000. Particularly preferred are copolymers with a styrene/butadiene ratio ranging from 25/75 to 35/65 and a molecular weight ranging from 100,000 to 400,000. These copolymers can also be used in oil-extended form.

It is convenient to operate with a weight ratio between bituminous product and polymer ranging from 80:20 to 95:5, preferably from 85:15 to 90:10.

Preferred aspects of the invention are to use in step (a) a time range of 15 minutes to 7 hours and in step (b) a time range of 15 minutes to 120 minutes, or to use in step (a) a time range of 15 minutes to 120 minutes and in step (b) a time range of 15 minutes to 7 hours.

Waxes are preferably used containing from 40 to 100 carbon atoms, having a melting point ranging from 70° C. to 120° C. Waxes which can be well used are those of both an oil origin and of a synthetic origin. Waxes of an oil origin are, for example, paraffinic waxes and micro-crystalline waxes. Waxes of a synthetic origin are preferably waxes from Fischer-Tropsch processes, i.e. deriving from the reaction of carbon monoxide and hydrogen, at a high pressure, on a metallic catalyst.

A preferred aspect is to operate in a weight ratio between bituminous mixture (A), and in particular between the mixture resulting from step (a), and wax which varies from 100:5 to 100:10.

The mixtures stable during storage containing bitumen, thermoplastic polymer and wax, and in particular mixtures where the bitumen is characterized by an $I_C$ value ranging from 0.200 to 0.270, wherein $I_C$ is defined as indicated above, wherein the polymer is in a quantity varying from 5 to 30% by weight with respect to the weight of the mixture consisting of bitumen and polymer, and the wax is a hydrocarbon wax containing at least 40 carbon atoms and having a melting point of at least 70° C., in a quantity varying from 4.7 to 16.7% by weight with respect to the weight of the total mixture, are new and are a further aspect of the present invention.

The thermoplastic polymer preferably has the formula $X(A-B)_m$ defined above, wherein X, A, B and m have the meanings previously specified.

Particularly preferred are concentrated mixtures consisting of bitumen, thermoplastic polymer and wax, wherein the polymer is in a quantity varying from 5 to 30% by weight with respect to the weight of the mixture consisting of bitumen and polymer, and the wax is a hydrocarbon wax containing at least 40 carbon atoms and having a melting point of at least 70° C., in a quantity varying from 4.7 to 16.7% by weight with respect to the weight of the total mixture.

These high-concentration bituminous mixtures can be subsequently diluted with a bitumen or with a bituminous component in such a quantity as to obtain a modified bitumen useful for the preparation of ligands for high-performance road conglomerates, impermeabilizing membranes, bituminous emulsions and for all uses in which a bituminous product having the characteristics previously indicated is required.

The concentration of wax in the final product preferably ranges from 0.5 to 5.0% by weight with respect to the total weight of the mixture.

The bitumen is used in such a quantity that the content of polymer in the final mixture ranges from 1 to 10% by weight with respect to the weight of the total mixture. The mixing is preferably effected at a temperature ranging from 160 to 200° C. for at time of 30 to 90 minutes. The dilution is preferably effected using a bitumen having an $I_C$ ranging from 0.270 to 0.700.

The bituminous mixtures containing bitumen, thermoplastic polymer in a quantity ranging from 1 to 10% by weight with respect to the weight of the total mixture, hydrocarbon wax containing at least 40 carbon atoms and having a melting point of at least 70° C., in a quantity varying from 0.5 to 5.0% by weight with respect to the total weight of the mixture, are in turn new and are a further object of the present invention.

In particular, an object of the present invention relates to bituminous mixtures containing bitumen, thermoplastic polymer in a quantity ranging from 1 to 10% by weight with respect to the weight of the total mixture, hydrocarbon wax containing at least 40 carbon atoms and having a melting point of at least 70° C., in a quantity varying from 0.5 to 5.0% by weight with respect to the total weight of the mixture, obtained by dilution of the high-concentration bituminous mixtures indicated above. Diluted mixtures consisting of bitumen, thermoplastic polymer and waxes, in the proportions indicated above, are particularly preferred, wherein the waxes have the characteristics specified above.

The use of high-molecular-weight hydrocarbon wax in the concentrated composition avoids the drawbacks described above with reference to the known art: in particular, with the same polymer content in the concentrated mixture, the viscosity is lowered, consequently reducing problems due to the movement of the product. Lower storage temperatures are therefore necessary, thus reducing the possibility of degradation of the mixture. It is consequently possible to increase the transportation times and therefore also the distances of the concentrated mixture, favouring a better use in peripheral plants.

It is also possible, on the other hand, to increase the polymer content in the concentrated mixture, making its use at peripheral plants more convenient, as the dilution ratio can be increased.

Finally, the concentrated mixture, object of the present invention, characterized in that it can be composed of a bitumen with the characteristics indicated above, a thermoplastic polymer and hydrocarbon wax having a high molecular weight and high melting point, allows modified bitumens to be prepared, which are perfectly in line with normal productions. This mixture, in fact, is not only stable during storage under heat and can be easily moved, but also allows modified bitumens to be obtained, by means of suitable dilutions, for road use, in turn stable during storage, easily moveable, with excellent performance characteristics.

With these products, it is possible to prepare bituminous conglomerates which can be easily used under extreme environmental conditions, with lower temperatures with respect to the normal values, requiring a lower mixing temperature in the plant with the inert products due to the lower viscosity under heat due to the presence of the wax, thus limiting energy consumption and reducing the emission of fumes.

The following examples are provided for purely illustrative purposes of the invention without limiting its contents in any way.

EXAMPLE 1 (COMPARATIVE)

A concentrated bituminous mixture, stable during storage, containing 11.2% by weight of SBS having a weight average molecular weight of 250,000 and a styrene/butadiene weight ratio of 30/70, has the characteristics indicated in the following table:

| formulation number | — | 1 | method |
|---|---|---|---|
| polymer content | % weight | 11.2 | |
| wax content | % weight | 0.0 | |
| penetration at 25° C. | dmm | 40 | EN 1426 |
| softening point ball-ring | ° C. | 121 | EN 1427 |
| viscosity at 180° C. | Pa × sec | 1.8 | EN 13702-1 |
| viscosity at 200° C. | Pa × sec | 1.2 | EN 13702-1 |
| P.A. tube test after 3 days | ° C. | 115/115 | EN 13399 |
| Δ P.A Head/bottom 3 days | ° C. | 0.0 | EN 1427 |

EXAMPLE 2

A concentrated bituminous mixture, stable during storage, containing 11.2% by weight, with respect to the weight of the mixture consisting of bitumen and polymer, of SBS having a weight average molecular weight of 250,000 and a styrene/butadiene weight ratio of 30/70, and 5% by weight, with respect to the total weight of the mixture, of wax from the Fischer-Tropsch process, is prepared as follows:

the concentrated mixture, stable during storage, of Example 1, is mixed with the Fischer-Tropsch wax, in a weight ratio of 100:5; the mixing is effected at a temperature of 195° C. for a time of 7 hours. The resulting mixture has the characteristics indicated in the following table:

| formulation number | — | 2 | method |
|---|---|---|---|
| polymer content | % weight | 11.2 | |
| wax content | % weight | +5.0 | |
| penetration at 25° C. | dmm | 28 | EN 1426 |
| softening point ball-ring | ° C. | 113 | EN 1427 |
| viscosity at 180° C. | Pa × sec | 1.5 | EN 13702-1 |
| viscosity at 200° C. | Pa × sec | 0.8 | EN 13702-1 |
| P.A. tube test after 3 days | ° C. | 112/111 | EN 13399 |
| Δ P.A Head/bottom 3 days | ° C. | 1.0 | EN 1427 |

After 3 days of storage at 180° C. of the concentrated bituminous composition containing waxes, there is substantially no difference between the softening points determined on samples taken from the head and from the bottom of the container, thus indicating that the characteristics of stability during storage of said mixture have remained unaltered, whereas there is a lower viscosity: the presence of waxes consequently gives the resulting concentrated mixture improved characteristics in terms of movability due to the lower viscosity.

EXAMPLE 3 (COMPARATIVE)

A concentrated bituminous mixture, stable during storage, containing 9.0% by weight of SBS having a weight average molecular weight of 250,000 and a styrene/butadiene weight ratio of 30/70, has the characteristics indicated in the following table:

| formulation number | — | 3 | method |
|---|---|---|---|
| polymer content | % weight | 9.0 | |
| wax content | % weight | 0.0 | |
| penetration at 25° C. | dmm | 56 | EN 1426 |
| softening point ball-ring | ° C. | 107 | EN 1427 |
| viscosity at 160° C. | Pa × sec | 2.8 | EN 13702-1 |
| viscosity at 180° C. | Pa × sec | 1.0 | EN 13702-1 |
| viscosity at 200° C. | Pa × sec | 0.6 | EN 13702-1 |
| P.A. tube test after 3 days | ° C. | 107/106 | EN 13399 |
| Δ P.A Head/bottom 3 days | ° C. | 1.0 | EN 1427 |

EXAMPLE 4

A concentrated bituminous mixture, stable during storage, containing 9.0% by weight, with respect to the weight of the mixture consisting of bitumen and polymer, of SBS having a weight average molecular weight of 250,000 and a styrene/butadiene weight ratio of 30/70, and 4% by weight, with respect to the total weight of the mixture, of Fischer-Tropsch wax, is prepared as follows:

the concentrated mixture, stable during storage, of Example 3, is mixed with the Fischer-Tropsch wax, in a weight ratio of 100:4; the mixing is effected at a temperature of 195° C. for a time of 7 hours. The resulting mixture has the characteristics indicated in the following table:

| formulation number | — | 4 | method |
|---|---|---|---|
| polymer content | % weight | 9.0 | |
| wax content | % weight | +4.0 | |
| penetration at 25° C. | dmm | 50 | EN 1426 |
| softening point ball-ring | ° C. | 107 | EN 1427 |
| viscosity at 160° C. | Pa × sec | 1.9 | EN 13702-1 |
| viscosity at 180° C. | Pa × sec | 0.8 | EN 13702-1 |
| viscosity at 200° C. | Pa × sec | 0.5 | EN 13702-1 |
| P.A. tube test after 3 days | ° C. | 109/107 | EN 13399 |
| Δ P.A Head/bottom 3 days | ° C. | 2.0 | EN 1427 |

After 3 days of storage at 180° C. of the concentrated bituminous composition, there is substantially no difference between the softening points determined on samples taken from the head and from the bottom of the container, thus indicating that the characteristics of stability during storage of said mixture have remained unaltered, whereas there is a lower viscosity: the presence of waxes consequently gives the resulting concentrated mixture improved characteristics in terms of movability due to the lower viscosity.

EXAMPLE 5

A concentrated bituminous mixture, stable during storage, containing 13.5% by weight, with respect to the weight of the mixture consisting of bitumen and polymer, of SBS having a weight average molecular weight of 250,000 and a styrene/butadiene weight ratio of 30/70, and 6.0% by weight, with respect to the total weight of the mixture, of Fischer-Tropsch wax, is prepared as follows:
a mixture, stable during storage, containing 86.5% of bitumen and 13.5% by weight of SBS, is mixed with the Fischer-Tropsch wax, in a weight ratio of 100:6, at a temperature of 195° C. for a time of 7 hours. The resulting concentrated mixture has the characteristics indicated in the following table:

| formulation number | — | 5 | method |
|---|---|---|---|
| polymer content | % weight | 13.5 | |
| wax content | % weight | +6.0 | |
| penetration at 25° C. | dmm | 27 | EN 1426 |
| softening point ball-ring | ° C. | 126 | EN 1427 |
| viscosity at 180° C. | Pa × sec | 4.1 | EN 13702-1 |
| viscosity at 200° C. | Pa × sec | 2.2 | EN 13702-1 |
| P.A. tube test after 3 days | ° C. | 126/125 | EN 13399 |
| Δ P.A Head/bottom 3 days | ° C. | 1.0 | EN 1427 |

After 3 days of storage at 180° C. of the concentrated bituminous composition, there is substantially no difference between the softening points determined on samples taken from the head and from the bottom of the container, thus indicating that said mixture remains stable during storage and with a viscosity value which is such as to allow it to be moved at normal temperatures of use for these products.

EXAMPLE 6

A formulation of "hard" modified bitumen, stable during storage and with optimum general characteristics, is prepared by mixing the formulation resulting from Example 2 with bitumen, so as to have a final content of SBS equal to 4.5% by weight with respect to the mixture of bitumen and polymer alone, with 2.0% by weight of waxes with respect to the weight of the total mixture. The mixing is effected at a temperature of 190° C. and for a time of 30 minutes. The resulting formulation has the characteristics indicated in the following table:

| formulation number | — | 6 | method |
|---|---|---|---|
| polymer content | % weight | 4.5 | |
| wax content | % weight | +2.0 | |
| penetration at 25° C. | dmm | 54 | EN 1426 |
| softening point ball-ring | ° C. | 90.0 | EN 1427 |
| penetration index | — | +5.8 | UNI 4163 |
| Fraass breaking point | ° C. | −13 | EN 12593 |
| viscosity at 120° C. | Pa × sec | 2.2 | EN 13702-1 |
| viscosity at 135° C. | Pa × sec | 1.1 | EN 13702-1 |
| viscosity at 160° C. | Pa × sec | 0.4 | EN 13702-1 |
| ductility at 25° C. | cm | 83 | CNR BU 44 |
| Cohesion at 25° C. | J/cm2 | 0.7 | EN13589-13703 |
| Elastic recovery at 25° C. | % | 83 | EN 13398 |
| P.A. tube test after 3 days | ° C. | 88/86 | EN 13399 |
| Δ P.A. Head/bottom 3 days | ° C. | 2.0 | EN 1427 |

EXAMPLE 7 (COMPARATIVE)

A formulation of "hard" modified bitumen is prepared by mixing the formulation without waxes of Example 3 with bitumen, so as to have a final content of SBS equal to 4.5% by weight. The mixing is effected at a temperature of 185° C. and for a time of 30 minutes. As appears evident from comparing the data indicated in the table with those of the formulation of Example 6, in this case a modified bitumen is obtained with characteristics comparable to those of the bitumen of Example 6, but with higher viscosities and therefore with greater processing difficulty.

| formulation number | — | 7 | method |
|---|---|---|---|
| polymer content | % weight | 4.5 | |
| wax content | % weight | 0.0 | |
| penetration at 25° C. | dmm | 55 | EN 1426 |
| softening point ball-ring | ° C. | 93 | EN 1427 |
| penetration index | — | +6.2 | UNI 4163 |
| Fraass breaking point | ° C. | −11 | EN 12593 |
| viscosity at 120° C. | Pa × sec | 3.6 | EN 13702-1 |
| viscosity at 135° C. | Pa × sec | 1.8 | EN 13702-1 |
| viscosity at 160° C. | Pa × sec | 0.6 | EN 13702-1 |
| ductility at 25° C. | cm | >100 | CNR BU 44 |
| Cohesion at 25° C. | J/cm2 | 0.4 | EN13589-13703 |
| Elastic recovery at 25° C. | % | 86 | EN 13398 |
| P.A. tube test after 3 days | ° C. | 91/91 | EN 13399 |
| Δ P.A. Head/bottom 3 days | ° C. | 0.0 | EN 1427 |

EXAMPLE 8

A formulation of "high modulus" modified bitumen, stable during storage and with excellent general characteristics, is prepared by diluting the concentrated blend of Example 4 with a traditional bitumen, so as to have a final content of SBS equal to 4.5% by weight with respect to the weight of the mixture consisting of bitumen and polymer, with 2.0% by weight of waxes with respect to the weight of the total mixture. The mixing is effected at a temperature of 185° C. and for a time of 30 minutes.

| formulation number | — | 8 | method |
|---|---|---|---|
| polymer content | % weight | 4.5 | |
| wax content | % weight | +2.0 | |
| penetration at 25° C. | dmm | 25 | EN 1426 |
| softening point ball-ring | ° C. | 99.5 | EN 1427 |
| penetration index | — | +4.9 | UNI 4163 |
| Fraass breaking point | ° C. | −6 | EN 12593 |
| viscosity at 120° C. | Pa × sec | 3.9 | EN 13702-1 |

| viscosity at 135° C. | Pa × sec | 1.6 | EN 13702-1 |
| viscosity at 160° C. | Pa × sec | 0.5 | EN 13702-1 |
| ductility at 25° C. | cm | 80 | CNR BU 44 |
| Cohesion at 25° C. | J/cm2 | 2.0 | EN13589-13703 |
| Elastic recovery at 25° C. | % | 80 | EN 13398 |
| P.A. tube test after 3 days | ° C. | 98/98 | EN 13399 |
| Δ P.A. Head/bottom 3 days | ° C. | 0.0 | EN 1427 |

EXAMPLE 9 (COMPARATIVE)

A formulation of "high modulus" modified bitumen but without waxes, is prepared as in Example 8, by diluting the concentrated blend of Example 3 with a traditional bitumen, so as to have a final content of SBS equal to 4.5% by weight. As appears evident from comparing the data indicated in the table with those of the formulation of Example 8, in this case a modified bitumen is obtained with characteristics comparable to those of the bitumen of Example 8, but with higher viscosities and therefore with greater processing difficulty.

| formulation number | — | 9 | method |
|---|---|---|---|
| polymer content | % weight | 4.5 | |
| wax content | % weight | 0.0 | |
| penetration at 25° C. | dmm | 29 | EN 1426 |
| softening point ball-ring | ° C. | 82.5 | EN 1427 |
| penetration index | — | +3.3 | UNI 4163 |
| Fraass breaking point | ° C. | −6 | EN 12593 |
| viscosity at 120° C. | Pa × sec | 7.3 | EN 13702-1 |
| viscosity at 135° C. | Pa × sec | 3.2 | EN 13702-1 |
| viscosity at 160° C. | Pa × sec | 1.0 | EN 13702-1 |
| ductility at 25° C. | cm | 65 | CNR BU 44 |
| Cohesion at 25° C. | J/cm2 | 1.4 | EN13589-13703 |
| Elastic recovery at 25° C. | % | 82 | EN 13398 |
| P.A. tube test after 3 days | ° C. | 81/82 | EN 13399 |
| Δ P.A. Head/bottom 3 days | ° C. | 1.0 | EN 1427 |

The invention claimed is:

1. Method for preparing mixtures consisting of bitumen, thermoplastic polymer and wax, wherein the polymer is in amounts in the range from 5 to 30% by weight with respect to the weight of the mixture made up of bitumen and polymer, and the wax is in amounts in the range from 4.7 to 16.7% by weight with respect to the weight of the total mixture, which consists of reacting a concentrated mixture (A), stable at storage, containing bitumen and thermoplastic polymer in the range of from 5 to 30% by weight, with a hydrocarbon wax containing a number of carbon atoms in the range from 40 to 100 and having a melting temperature in the range from 70° C. to 120° C., in weight ratio between mixture (A) and wax in the range from 100:5 to 100:20, at a temperature in the range from 160 to 200° C. and for a time ranging from 15 minutes to 7 hours, wherein said mixture A is obtained by reacting a bituminous product having; a total asphaltenes, resins, saturates and aromatics content such to meet the requirement that the Ic value be in the range from 0.200 to 0.270 in the expression:

$Ic=(C7+C5+S)/(A+R)$ where:
C7=concentration of alsphaltenes precipitated with n-heptane, in % by weight;
C5=concentration of alsphaltenes precipitated with n-pentane, in % by weight;
S=concentration of saturates, in % by weight;
A=concentration of aromatics, in % by weight;
R=concentration of resins, in % by weight, at a temperature ranging from 160° C. to 200° C. and for a time ranging from 15 minutes to 7 hours with a thermoplastic polymer, in weight ratio between bitumen and polymer ranging from 70:30 to 95:5, the thermoplastic polymer being a block copolymer between vinylbenzenes and conjugated dienes with radial structure, whose general formula is $X(A-B)_m$ where A represents a block obtained from monomers of the vinyl-aromatic type, B is a block obtained from diene monomers, X is a radical derived from a coupling agent and m varies from 3 to 5.

2. Method according to claim 1 wherein the $I_c$ value is in the range from 0.240 to 0.260.

3. Method according to claim 1 wherein the bitumens are made up of a bituminous component selected from among distillation bitumens, aromatic distillates obtained from petroleum or from mixtures of thereof.

4. Method according to claim 3 wherein the bituminous component is selected from among aromatic extracts from a lubricating base or mixture of aromatic extract and vacuum residue.

5. Method according to claim 1 wherein the weight ratio between bituminous product and polymer in the mixture (A) is in the range between 85:15 and 90:10.

6. Method according to claim 1 wherein the waxes are Fischer Tropsch process waxes.

7. Method according to claim 1 wherein the weight ratio between bituminous mixture (A) and wax is in the range from 100:5 to 100:10.

8. Concentrated bituminous mixture, stable at storage, consisting of bitumen, thermoplastic polymer and wax, wherein the polymer is in amounts in the range from 5 to 30% by weight with respect to the weight of the mixture made up of bitumen and polymer, and the wax is a hydrocarbon wax containing a number of carbon atoms in the range from 40 to 100 and having a melting point ranging from 70° C. to 120° C., in amounts in the range from 4.7 to 16.7% by weight with respect to the weight of the total mixture, wherein the bitumen has a total asphaltenes, resins, saturates and aromatics content such to meet the requirement that the Ic index be in the range from 0.200 to 0.270 in the expression:

$Ic=(C7+C5+S)/(A+R)$ where:
C7=concentration of asphaltenes precipitated with n-heptane, in % by weight;
C5=concentration of asphaltenes precipitated with n-pentane, in % by weight;
S=concentration of saturates, in % by weight;
A=concentration of aromatics, in % by weight;
R=concentration of resins, in % by weight,
and wherein the thermoplastic polymer is a radial copolymer consisting of blocks of polystyrene and of polybutadiene (SBS) with a styrene/butadiene ratio ranging from 25/75 to 35/65 and a molecular weight ranging from 100,000 to 400,000.

9. Method according to claim 1 for preparing a bituminous mixture, stable at storage, consisting of bitumen, thermoplastic polymer and wax, wherein the polymer is in amounts in the range from 1 to 10% by weight with respect to the weight of the total mixture and the wax is a hydrocarbon wax, in amounts in the range from 0.5 to 5.0% by weight with respect to the weight of the total mixture,
wherein said process additionally comprises a dilution step of the bituminous composition resulting from claim 1 with bitumen in amounts such to obtain a final concentration of the polymer in the range between 1 and 10% by weight with respect to the total weight of the mixture and a wax concentration in the range from 0.5 to 5.0% by weight with respect to the total weight of the mixture.

10. Method according to claim 9 wherein the dilution is performed at a temperature in the range from 160 to 200° C. for a period of time in the range from 30 to 90 minutes.

11. Method according to claim 9 or 10 wherein the bitumen used for diluting has an $I_c$ in the range from 0.270 to 0.700.

12. Method according to claim 1 or 9,
wherein either
reacting the bituminous product with the thermoplastic polymer is for a time of 15 minutes to 7 hours and reacting the concentrated mixture (A) with the hydrocarbon wax is for a time of 15 minutes to 120 minutes,
or
reacting the bituminous product with the thermoplastic polymer is for a time of 15 minutes to 120 minutes and reacting the concentrated mixture (A) with the hydrocarbon wax is for a time of 15 minutes to 7 hours.

13. Bituminous mixture, stable at storage, consisting of bitumen, thermoplastic polymer and wax, wherein the polymer is in amounts in the range from 1 to 10% by weight with respect to the weight of the total mixture and the wax is a hydrocarbon wax a number of carbon atoms from 40 to 100 and having a melting point from 70° C. to 120° C., in amounts in the range from 0.5 to 5.0% by weight with respect to the weight of the total mixture, and wherein the thermoplastic polymer is a radial copolymer consisting of blocks of polystyrene and of polybutadiene (SBS) with a styrene/butadiene ratio ranging from 25/75 to 35/65 to and a molecular weight ranging from 100,000 to 400,000.

14. A method of using the concentrated bituminous mixture of claim 8 to prepare—through dilution—modified bitumens for road purposes, for industrial purposes and for bituminous emulsions.

15. A method of using the bituminous mixture of claim 13 for road purposes or to prepare conglomerates useable under harsh environmental conditions.

16. The method according to claim 1, wherein reacting the bituminous product with the thermoplastic polymer is for a time of 15 minutes to 120 minutes and wherein reacting the concentrated mixture (A) with the hydrocarbon wax is for a time of 15 minutes to 120 minutes.

* * * * *